United States Patent [19]

Fusiak et al.

[11] Patent Number: 5,049,300
[45] Date of Patent: Sep. 17, 1991

[54] METHOD OF ACTIVATING ACIDIFIED NMP TO PROVIDE AN EFFECTIVE PAINT REMOVER COMPOSITION

[75] Inventors: Frank Fusiak, Bayonne; Kolazi S. Narayanan, Palisades Park, both of N.J.

[73] Assignee: Creativity Technologies Group, Inc., Greenville, S.C.

[21] Appl. No.: 590,754

[22] Filed: Oct. 1, 1990

[51] Int. Cl.$^5$ .......................... C09D 9/00; C11D 7/50; B08B 7/00
[52] U.S. Cl. .................................. 252/162; 252/153; 252/170; 252/171; 252/DIG. 8; 134/38
[58] Field of Search ............... 252/153, 162, 170, 171, 252/DIG. 8; 134/38

[56] References Cited

U.S. PATENT DOCUMENTS 4,780,235 10/1988 Jackson ..................... 252/DIG. 8
4,812,255 3/1989 Suwala ............................. 252/162

FOREIGN PATENT DOCUMENTS

87/07628 12/1987 World Int. Prop. O. .

Primary Examiner—Paul Lieberman
Assistant Examiner—William S. Parks
Attorney, Agent, or Firm—Walter Katz

[57] ABSTRACT

Acidified N-methyl-2-pyrrolidone (NMP) is activated with 1–20% by weight of ethyl 3-ethoxypropionate (EEP) to provide an effective composition for removal of both uncured and cured paints from wood and metal surfaces.

21 Claims, 1 Drawing Sheet

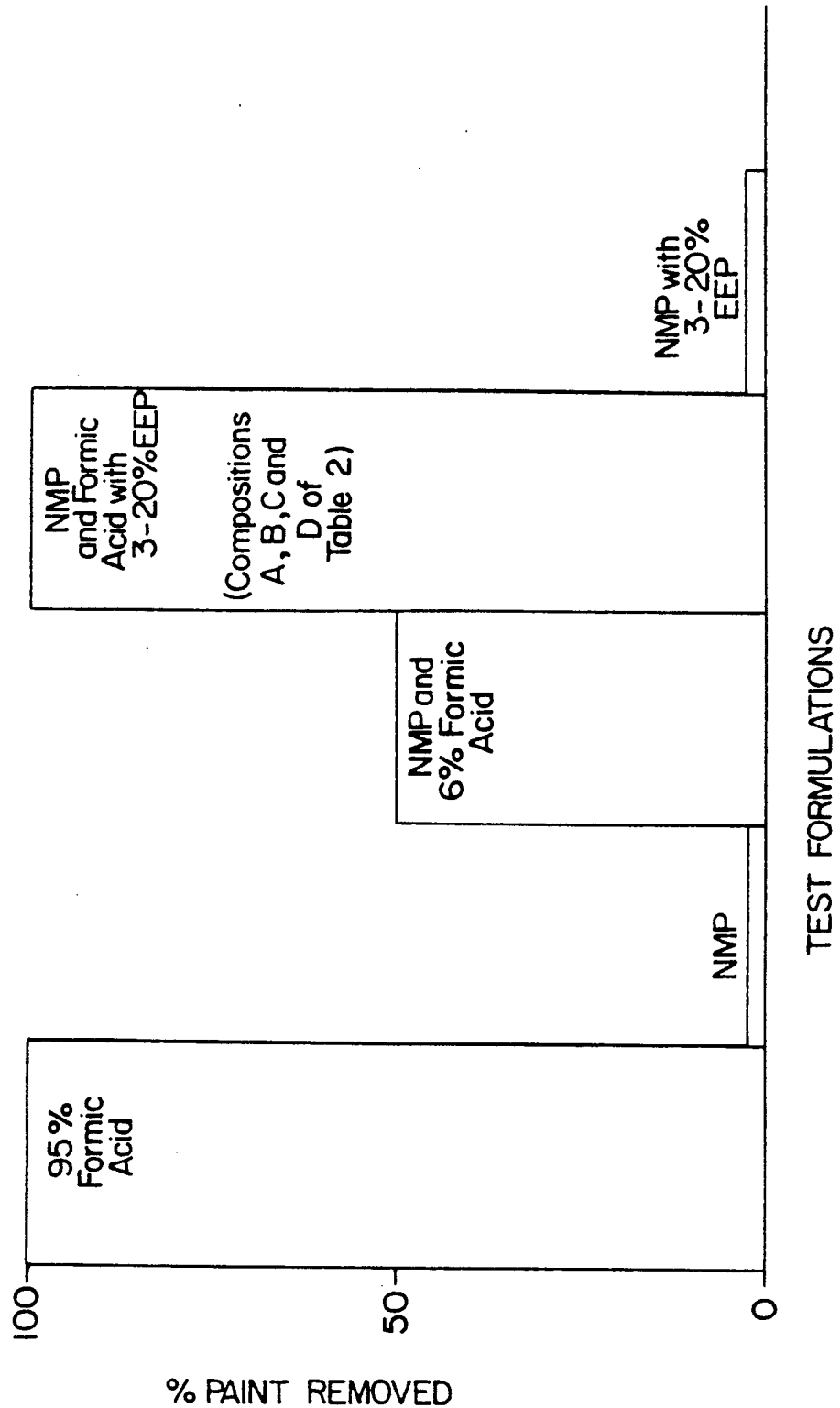

METHOD OF ACTIVATING ACIDIFIED NMP TO PROVIDE AN EFFECTIVE PAINT REMOVER COMPOSITION

BACKGROUND OF THE INVENTION

1. Field of the Invention

This invention relates to paint remover formulations, and more particularly, to formic acid-based compositions which are effective and safe during use.

2. Description of the Prior Art

The term "varnish and paint remover" as applied herein refers to chemical compositions which can strip or facilitate stripping of coatings, such as, paint, varnish, lacquer, shellac, polyurethane finishes and enamels, used to protect substrates such as wood and metal and to beautify them.

Methylene chloride paint strippers are currently the industry standard for stripper performance. Methylene chloride strippers are effective for quickly softening most types of paints. The speed at which methylene chloride performs is believed to be due to its high solvent power coupled with high volatility as reflected by its extremely fast evaporation rate which shortens the work life of methylene chloride paint strippers. Frequently, when methylene chloride paint strippers are used on thick accumulations of paint, more than one application is required since the work life is insufficient to permit penetration through the accumulation of paint.

Suwala, in U.S. Pat. No. 4,812,255 described paint removing compositions which included formic acid and/or acetic acid, N-methyl-2-pyrrolidone (NMP) and an alkylene glycol ether. In the suitable embodiments, the compositions comprised 10 -30% by weight of a mixture of 1 -2 parts formic acid and 3-4 parts acetic acid, 15-40 % by weight of NMP and 40-60% by weight of tripropylene glycol methyl ether (TPM).

Nelson, in U.S. Pat. No. 4,749,510, also described a formic acid-based paint stripping formulation which included 2-15% by weight of formic acid, 20-90% NMP and 30-70% of a 140° F. flash aromatic hydrocarbon solvent, such as Hi Sol ® 15 of the Ashland Chemical Company.

Caster, in U.S. Pat. No. 4,865,758 described a method of removing paint with a lower alkyl substituted 2-oxazolidinone. In comparative results reported therein, it was disclosed that ethyl 3-ethoxypropionate had no effect on paint removal.

McCullins, in British Pat. No. 1,487,737, described a paint remover composition for aerosol type paints in the form of a gel which included methyl ethyl ketone, ethyl acetae, ethoxyethanol and 2-ethoxyethyl acetate. This mixture of solvents was considered effective for paint sprayed graffiti as a viscous, transparent gel containing particles of silica or alumina in suspension.

Palmer, in U.S. Pat. No. 4,120,810, described paint remover compositions of NMP and/or BLO, and at least 35 mole % of blends of alkyl naphthalenes and alkyl benzenes.

These and other compositions, however, have not been particularly effective for removing paint from surfaces without containing objectionable halogenated, aromatic or ether compounds. Furthermore, they do not possess the attributes of being biodegradable, non-flammable, a low vapor pressure and low toxicity.

Accordingly, it is an object of this invention to satisfy the above criteria for an environmentally safe commercial product for removing paint from wood and metal surfaces, and to perform such removal effectively with less material than other related products on the market today.

A particular object of this invention is to provide a paint removal composition in which an activator for acidified NMP is provided which enhances its normally effective action.

Still another object of the invention is to provide a paint stripping formulation which is effective but not overly corrosive so that it can be handled and used easily and safely.

These and other objects and features of the invention will be made apparent from the following more particular description thereof.

IN THE DRAWINGS

The FIGURE is a graphical representation of effectiveness for removing paint from wood of various compositions containing formic acid, NMP and an activator therefor which is ethyl 3-ethoxypropionate (EEP).

SUMMARY OF THE INVENTION

A method is provided for effectively removing both uncured and cured paint from wood or metal surfaces which comprises activating acidified NMP with about 1-20% by weight of EEP, and applying the resultant composition to the surface to be treated.

In the preferred embodiments of the invention, the NMP is acidified with an inorganic or organic acid having a pKa $\leq 4.0$, preferably formic, sulfuric or phosphoric acids.

A preferred composition includes as essential components: 1-25% by weight formic acid, 55-90% by weight NMP, and 1-20% by weight EEP as an activator compound, most preferably, 2-20% formic acid, 65-75% NMP and 2-15% EEP.

The optimal composition includes 7% formic acid, 69% NMP and 4% EEP.

Optionally, the composition may include one or more of the following: a diluent, a surfactant, a thickener, a flavoring agent and a bittering agent, generally in the total amount of up to about 40% by weight of the composition.

Within the ranges defined above, EEP exerts an activating effect for cured and uncured paint removal upon acidified NMP, while NMP reduces the corrosive effect of the acid.

DETAILED DESCRIPTION OF THE INVENTION

The paint remover composition of the invention includes the following essential and optional components listed in Table 1 below.

TABLE 1

| COMPOSITION OF INVENTION | | | |
|---|---|---|---|
| Essential Components | Suitable (% by wt.) | Preferred | Optimum |
| NMP | 55-90 | 65-75 | 69 |
| Acid, e.g. formic acid | 1-25 | 2-20 | 7 |
| EEP | 1-20 | 2-15 | 4 |
| Optional Components | Suitable (% by wt.) | | Optimum |
| Total Diluent Surfactant | 0-40% | | 20% 18 |

TABLE 1-continued

| COMPOSITION OF INVENTION | |
|---|---|
| Thickener | 1.25 |
| Flavoring Agent | 0.3 |
| Bittering Agent | 0.002 |

The NMP component is available from GAF Chemicals Corporation.

Suitable acids for acidifying NMP include inorganic and organic acids having a pKa value of about 4.0 or less, such as formic acid, phosphoric acid and sulfuric acid. Formic acid is preferred.

The EEP component is available from Eastman Chemicals as Ektapro ® EEP solvent.

Suitable diluents include organic hydrocarbons such as dipentene and xylene, γ-butyrolactone, tetrahydrofurfuryl alcohol and tetramethylene urea.

However, the optional diluent component preferably is an acyclic or cyclic carbonate compound of the formula:

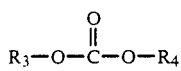

where $R_3$ and $R_4$ are selected from the grup consisting of methyl, ethyl or $R_3$ and $R_4$ together form a divalent ethylene, propylene or butylene group of a cyclic carbonate. Preferably, the diluent is propylene carbonate in an amount of about 20% by weight of the composition.

Suitable surfactants include non-ionic surfactants with HLB ranging from about 8-18, selected from:

1. The polyethylene oxide condensates of alkylphenols, e.g., the condensation products of alkylphenols or dialkyl phenols wherein the alkyl group contains from about 6 to about 12 carbon atoms in either branched chain or particularly straight chain configuration, for example, octyl cresol, octyl phenol or nonyl phenol, with ethylene oxide, the said ethylene oxide being present in amounts equal to about 5 to about 25 moles of ethylene oxide per mole of alkylphenol.

2. Partial esters formed by the reaction of fatty acids, for example of about 8 to about 18 carbon atoms, with polhydric alcohols, for example, glycerol, glycols, such as, mono-, di-, tetra- and hexaethyleneglycol, sorbitan, etc.; and similar compounds formed by the direct addition of varying molar ratios of ethylene oxide to the hydroxy group of fatty acids.

3. The condensation products of fatty acid partial esters with ethylene oxide, such as, fatty acid esters of polyoxyethylene sorbitan and sorbitol containing from about 3 to about 80 oxyethylene units per molecule and containing fatty acid groups having from about 8 to about 18 carbon atoms.

4. The condensation products of aliphatic alcohols having from about 8 to about 18 carbon atoms in either straight chain or branched chain configuration, for example, oleyl or cetyl alcohol, with ethylene oxide, the said ethylene oxide being present in amounts equal to about 30 to about 60 moles of ethylene oxide per mole of alcohol.

Examples of surface active agents which may be used are those supplied under the following trade names:

| Name | Approximate Chemical Constitution |
|---|---|
| Antaron ® | monocarboxyl cocoimidazoline |
| Igepon ® | alkyl sulfoamides |
| Alipal ® | ammonium salt of ethoxylate sulfate |
| Igepal ® | ethoxylated alkylphenol |
| Emulphogene ® | tridecyloxypoly(ethyleneoxy)ethanol |
| Span 40 ® | sorbitan monopalmitate |
| Parasyn ® | hydrogenated castor oil |
| Miraniol ® | cocoamphodipropionate |
| Trydet ® | polyethoxylated fatty acid ester |

Thickeners may also be included in the inventive composition. The preferred thickeners or gelling agents are cellulose derivatives which have the property of both water and organic solvent solubility. Cellulose derivatives of this type which are of particular interest are those ether derivatives containing etherifying groups selected from hydroxyalkyl groups and groups derived therefrom, such etherifying groups containing preferably up to about 5 or 6 carbon atoms. The gelling agent may also comprise cellulose ether derivatives which, in addition to etherifying groups selected from hydroxyalkyl groups and groups derived therefrom, contain other types of etherifying groups, especially small alkyl groups of, for example, one or two carbon atoms. However, such etherifying groups generally confer properties upon the cellulose derivative which are less acceptable for the present purpose, and the gelling agent is therefore conveniently substantially restricted to cellulose ether derivatives containing etherifying groups selected from hydroxyalkyl groups and groups derived therefrom.

Etherifying groups consisting of or derived from hydroxyalkyl groups containing up to 5 carbon atoms, particularly, 2, 3 or 4 carbon atoms, are of especial value. The hydroxypropyl celluloses, for example, have been found to be of particular value in giving a substantially transparent gel system with a suitable solvent system and in imparting quite adequate thickening and film-forming properties in their own right without the need of any other agents for these purposes. Conveniently, the hydroxypropyl group in such celluloses is derived from isopropanol rather than n-propanol but a number of variations in structure are possible even when this is the case. Thus, not all of the free hydroxy groups of the cellulose need necessarily be substituted and, if desired, the hydroxy groups of certain hydroxypropyl groups may, in turn, be substituted by a further hydroxypropyl group (as for example, in the Klucel ® materials described below). Hydroxypropyl celluloses employed in compositions according to the present invention conveniently have molecular weights in the range from about 50,000 to about 1,000,000, preferably from about 800,000 to about 1,000,000.

One form of hydroxypropyl cellulose which has been used with advantage is marketed under the trade name Klucel H and is based upon repeating units containing a pair of anhydroglucose groups in which 5 of the free hydroxyl groups are etherified, the units being of the type:

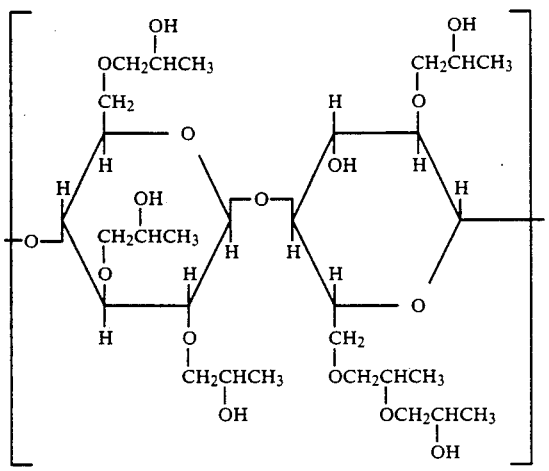

Klucel ® H has a similar chemical structure to Klucel ® MS 3.0, which may also be used, but is of higher molecular weight, and possesses particular advantages in terms of the viscosity of its solutions. Thus, a 1% solution of Klucel ® H in water has a viscosity in the range from 1,500 to 2,500 units and in ethanol the range is 1,000 to 2,500 units while solutions of Klucel ® MS 3.0, particularly in ethanol, have a lower viscosity. The property of possessing a substantially similar viscosity in organic solvent and aqueous solutions is a valuable one for gelling agents used in compositions according to the present invention. The proportion of gelling agent required in the compositions in order to give good gels, depends in part on the molecular weight of the gelling agent used, the usual range being from 0.25% to 2%. Thus, for example, with the usual proportion of gelling agent of from about 0.25% or 0.5% upwards is suitable for high molecular weight materials and of from about 2% upwards is suitable for low molecular weight materials. For high molecular weight materials, for example of molecular weights of 800,000 to 1,000,000, a proportion of above 1.5% is preferably avoided as it leads to a gel of too great a viscosity. With low molecular weight materials, larger proportions may be used before such a position is reached and, if the molecular weight is low enough, amounts of up to 10% or even 20% or more may be used. It will be appreciated, however, that the use of a smaller amount of material of higher molecular weight is generally to be preferred.

A typical fragrance is oil of wintergreen (methyl salicylate) although many others known in the art may be used as well.

A suitable bittering agent is denatonium benzoate although others known in the art may be used as well.

Representative compositions of the invention include the following Examples A-D below.

TABLE 2

| Component | Example No. (% by Wt.) | | | |
| --- | --- | --- | --- | --- |
|  | A | B | C | D |
| NMP | 69 | 72.5 | 71.75 | 69.75 |
| Formic acid | 7 | 6 | 6 | 6 |
| EEP | 4 | 20.0 | 20.0 | 7.0 |
| Propylene carbonate | 18 | — | — | 15.0 |
| Surfactant | 1 | 0.25 | 1.0 | 1.0 |
| Thickener | 0.3 | 1.25 | 1.25 | 1.25 |
| Bittering agent | 0.002 | — | — | — |

Referring now to the FIGURE, the bar graph shows the relative effectiveness of the compositions of Table 2 as compared to formic acid alone, NMP alone, a mixture of NMP and formic acid, and NMP and EEP, towards removal of polyester cured paint from aged painted doors. While formic acid itself is seen to be an effective paint remover, it is too corrosive for general use. NMP alone was totally ineffective. The combination of NMP and formic acid removed only 50% of the paint. Unexpectedly, the compositions of Table 2, i.e. a mixture of NMP, formic acid and EEP, removed 100% of the paint during the same 30 minute period of application, using the same quantity of stripper material. Furthermore, these compositions are non-corrosive and convenient in use.

While the invention has been described with particular reference to certain embodiments thereof, it will be understood that changes and modifications may be made which are within the skill of the art. Accordingly, it is intended to be bound only by the following claims, in which:

What is claimed is:

1. A method for effectively removing cured and uncured paint from wood or metal which comprises activating a composition consisting essentially of about 55-95% by weight NMP, about 1-25% by weight of an acid, and about 1-20% by weight of ethyl wherein said acid is an inorganic or organic acid having a pKa of lower than or equal to 4.0.

2. A method according to claim 1 wherein NMP is acidified with an inorganic or organic acid having a pKa ≧ 4.0.

3. A method according to claim 1 wherein said acid is selected from formic, sulfuric and phosphoric acids.

4. A method according to claim 1 wherein said acid is formic acid.

5. A method according to claim 1 wherein the composition consists essentially of
 (a) about 55-95% by weight NMP,
 (b) about 1-25% by weight of an acid selected from formic, sulfuric and phosphoric acids, and
 (c) about 1-20% by weight of EEP.

6. A method according to claim 5 wherein (a) is 65-90%, (b) is 2-20%, and (c) is 2-15%.

7. a method according to claim 5 wherein (a) is 89%, (b) is 7%, and (c) is 4%.

8. A method according to claim 5 wherein (b) is formic acid.

9. A method according to claim 6 wherein (b) is formic acid.

10. a method according to claim 7 wherein (b) is formic acid.

11. A composition for effectively removing cured and uncured paint from wood or metal which consists essentially of about 55-95% by weight of NMP, about 1-25% by weight of an acid, and about wherein said acid is an inorganic or organic acid having a pKa of lower than or equal to 4.0.

12. A composition according to claim 11 wherein said acid is selected from formic, sulfuric and phosphoric acids.

13. A composition according to claim 11 wherein said acid is formic acid.

14. A composition according to claim 11 which consists essentially of
 (a) about 55-95% by weight NMP,
 (b) about 1-25% by weight of an acid selected from formic, sulfuric and phosphoric acids, and (c) about 1-205 by weight of EEP.

15. A composition according to claim 11 wherein
(a) is 65-90%,
(b) is 2-20%, and
(c) is 2-15%.

16. A composition according to claim 11 wherein
(a) is 89%,
(b) is 7%, and
(c) is 4%.

17. A composition according to claim 11 wherein (b) is formic acid.

18. A composition according to claim 15 wherein (b) is formic acid.

19. A composition according to claim 16 wherein (b) is formic acid.

20. A composition according to claim 11 optionally including one or more of a diluent, a surfactant, a thickener, a flavoring agent and a bittering agent.

21. A composition according to claim 20 which optionally includes propylene carbonate as a diluent in the amount of up to 40% by weight of the composition.

* * * * *

UNITED STATES PATENT OFFICE
CERTIFICATE OF CORRECTION

Patent No. 5,049,300  Dated September 17, 1991

Inventor(s) FRANK FUSIAK AND KOLAZI S. NARAYANAN

It is certified that error appears in the above-identified patent and that said Letters Patent is hereby corrected as shown below:

ON THE TITLE PAGE

Assignee should be --- Creative Technologies Group, Inc. ---

Column 1, line 53, "acetae," should be --- acetate, ---.

Column 2, last line in Table 1, after "Surfactant" under the Optimum column add the number --- 1 ---.

Column 3, line 26, "grup" should be --- group ---.

Column 3, line 45, "polhydric" should be --- polyhydric ---.

Column 4, line 39, "especial" should be "special".

Claim 2, line 3, "pKa $\geq$ 4.0" should be --- pKa $\leq$ 4.0 ---.

Claim 7, line 1, "a" should be --- A ---.

Claim 14, column 7, line 1, "1-205" should be --- 1-20% ---.

UNITED STATES PATENT OFFICE
CERTIFICATE OF CORRECTION

Patent No. 5,049,300　　　　　　Dated September 17, 1991

Inventor(s) FRANK FUSIAK AND KOLAZI S. NARAYANAN

It is certified that error appears in the above-identified patent and that said Letters Patent is hereby corrected as shown below:

Claims 1 and 11 should read as follows:

--- 1. A method for effectively removing cured and uncured paint from wood or metal which comprises activating a composition consisting essentially of about 55-95% by weight NMP, about 1-25% by weight of an acid, wherein said acid is an inorganic or organic acid having a pKa of lower than or equal to 4.0, and about 1-20% by weight of ethyl 3-ethoxypropionate (EEP), and applying the resultant composition to the surface to be treated. ---

--- 11. A composition for effectively removing cured and uncured paint from wood or metal which consists essentially of about 55-95% by weight of NMP, about 1-25% by weight of an acid, wherein said acid is an inorganic or organic acid having a pKa of lower than or equal to 4.0, and about 1-20% by weight of ethyl 3-ethoxypropionate (EEP), of said composition. ---

Signed and Sealed this

Eighth Day of June, 1993

Attest:

MICHAEL K. KIRK

Attesting Officer　　　Acting Commissioner of Patents and Trademarks